June 8, 1965  W. H. SINK  3,187,867
MECHANICAL ASSIST DEVICE
Filed June 5, 1961  4 Sheets-Sheet 1

*INVENTOR.*
WILLIAM H. SINK
BY *Walter E. Pavlick*

ATTORNEY

June 8, 1965

W. H. SINK 3,187,867

MECHANICAL ASSIST DEVICE

Filed June 5, 1961

INVENTOR.
WILLIAM H. SINK
BY Walter E. Pavlick
ATTORNEY

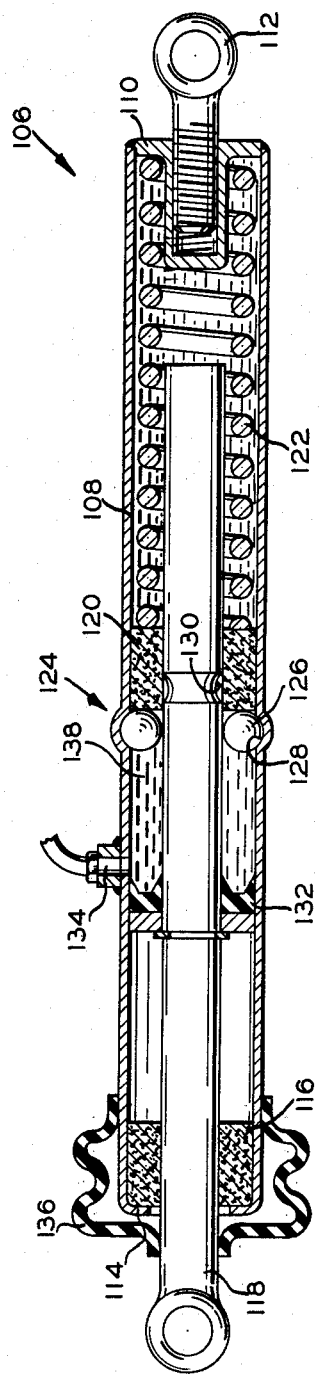
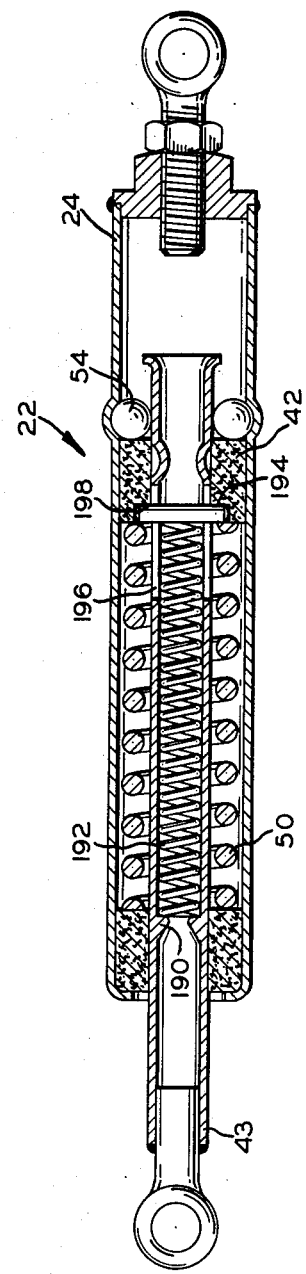

June 8, 1965 W. H. SINK 3,187,867
MECHANICAL ASSIST DEVICE
Filed June 5, 1961 4 Sheets-Sheet 4

*INVENTOR.*
WILLIAM H. SINK
BY Walter E. Pavlick

ATTORNEY

United States Patent Office 3,187,867
Patented June 8, 1965

3,187,867
MECHANICAL ASSIST DEVICE
William H. Sink, Toledo, Ohio, assignor to Dana Corporation, Toledo, Ohio, a corporation of Virginia
Filed June 5, 1961, Ser. No. 115,020
19 Claims. (Cl. 192—89)

This invention relates to assist devices for use with operating levers in general and more particularly to devices for assisting a vehicle operator in rotating a clutch actuating lever to disengage a normally engaged, spring loaded clutch.

Generally, the friction clutches used for engaging and disengaging a vehicle engine from its transmission are of a normally engaged, spring loaded type; that is, the clutch includes spring means for biasing a driven member into engagement with a drive member. These clutches must be capable of transmitting high torque loads, particularly when used on heavy vehicles such as trucks and tractors. Inasmuch as the torque loading for these vehicles is very high, it is apparent that the engaging springs employed must have a very high compression strength to obtain sufficient pressure between the drive and driven members to prevent slippage. Obviously then, the greater the compression strength of the springs the more effective the clutch is for transmitting torque.

In order to disengage a spring loaded clutch the biasing action of the engaging springs must be overcome. Thus, the magnitude of the biasing action of the engaging springs is limited by the minimum force with which it is desired to have the clutch actuating mechanism respond in order to disengage the clutch.

Normally, to disengage the clutch an operator moves a manually operable foot pedal or hand lever and upon release thereof the internal clutch engaging springs cause the clutch to re-engage. It is to be noted that during the operation just described, an operator, in manually moving the clutch operating lever to disengage the clutch, has to overcome the force of the clutch engaging springs and must hold the clutch lever in such disengaged position until the clutch is to be re-engaged. This operation is performed many times, especially when driving in city traffic where many stops and starts are required. Therefore, an operator expends a considerable amount of effort in physically overcoming the high compression strength of the clutch engaging springs.

Many devices have been devised to allow the employment of engaging spring means of great magnitude and still permit a vehicle operator to easily and conveniently overcome the biasing action of such spring means. The most frequently used assist or booster device is an over-center spring mechanism which is a tension spring having one end pivotally attached to a pivotal mounted actuating lever and having its other end pivotally attached to a fixed support. This spring is adapted to operate over a centerline which lies through the rotational axis of the lever and the pivotal attachment of the spring to the support, whereby the spring urges the lever to rotate in a direction to disengage the clutch when it is on one side of the centerline in opposition to the rotational urging force on the lever caused by the engaging springs of the clutch. It is seen then, that the assist force urging rotation of the lever is a product of the tension force developed by the spring multiplied by its effective moment arm which is the length of the line perpendicular to the rotational axis of the lever and perpendicular to the direction of the tension force. It is evident, therefore, that the typical over-center spring assist device becomes increasingly more effective as the lever is moved further and further towards its clutch-disengaged position since the effective moment arm becomes greater.

An undesirable feature inherent in these prior art mechanisms is that a large amount of rotational travel of the lever is required before the tension spring becomes operative to substantially assist the manual effort of the vehicle operator. Another undesirable feature is that the force rotating the lever to the clutch-disengaged position must not reach a value greater than the biasing action of the clutch engaging spring means, since if it does the lever will not return to its engaged position after the manual pressure imposed by the vehicle operator is removed. In these prior art devices, as the clutch approaches disengagement, the over-center spring load builds up. Thus, for a given biasing action developed by the spring engaging means of the clutch the magnitude of the over-center tension spring's original effective assisting effort is limited so that its final "build-up" load is not excessive.

The present invention is directed to a spring loaded assist device having a structure wherein a preloaded spring is inoperative when the clutch lever is in its engaged position and becomes operative upon the clutch lever's movement toward its disengaged position. The amount of movement before the assist device becomes operative can be adjusted as desired. Further, the structure is such that it will not build-up force as is the case with an over-center spring assist device. Thus, the magnitude of such an assist device is not limited in the same manner as the over-center spring assist device.

Therefore, a primary object of this invention is to provide an assist device for an operating lever wherein the spring means is inoperative in one lever position and yet operative to assist movement of the lever to another position.

Another object of this invention is to provide an assist device structure which is a self-contained unit so that it may be readily adapted for use with any actuating lever.

Yet another object of this invention is to provide an improved assist device which facilitates the movement of a clutch into disengaged position, but insures the complete return of the clutch into engaged position upon the release thereof.

Still another object of this invention is to provide an assist device for an operating means wherein the assist device will not build-up excessive urging forces.

A further object of this invention is to provide a structure having a minimum number of parts, which is efficient in operation and simple in construction.

Further objects and advantages will become apparent upon reading the following specification, together with the accompanying drawings which form a part hereof.

In the drawings:

FIG. 5 is a longitudinal sectional view of a modification of the present invention embodied in a hydraulic slave unit;

FIG. 9 shows the assist device of FIG. 2 provided with an additional spring means which urges the complete return of the clutch into its engaged position.

One preferred embodiment of this invention contemplates an assist device which is embodied in a self-contained unit so that it can be easily attached to any operating lever. Such a device comprises a pair of members, one member, in the form of reaction means, is adapted to be connected to a stationary support, and the other member, in the form of operating means, being movable relative thereto. A resilient spring means is normally connected to the stationary member in a preloaded condition and is adapted to be operatively connected to the movable member by coupling means. The coupling means is operative to connect the spring means to the movable member upon a predetermined amount of relative movement between the movable member and the stationary member whereby the spring means adds to the force already urging the movable member relative to the stationary member. When an operating level is in its fully released position the spring means of the assist device is preloaded and inoperative to subtract from the force of the device to be overcome until some relative movement of the assist device takes place.

Although the following specification and the accompanying drawings illustrate and disclose an assist device which has been primarily designed for use in connection with levers and linkages for operating spring loaded friction clutches, it is obvious that the invention may be adapted for other uses where similar results are desired.

Figure 1:
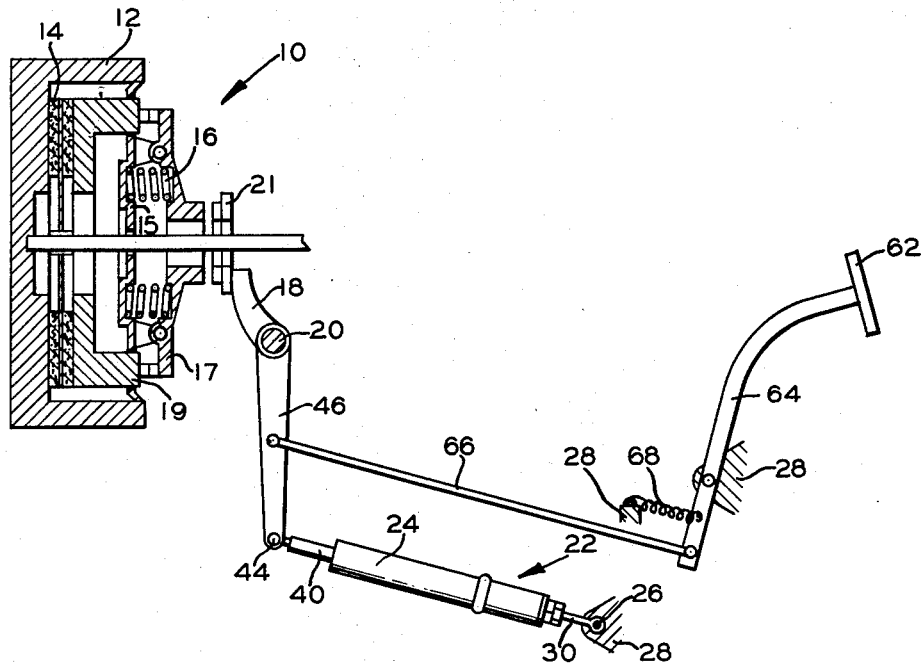
FIG. 1 is a diagrammatic elevation view of a clutch installation embodying the novel assist device shown in FIG. 2.
Figure 6:
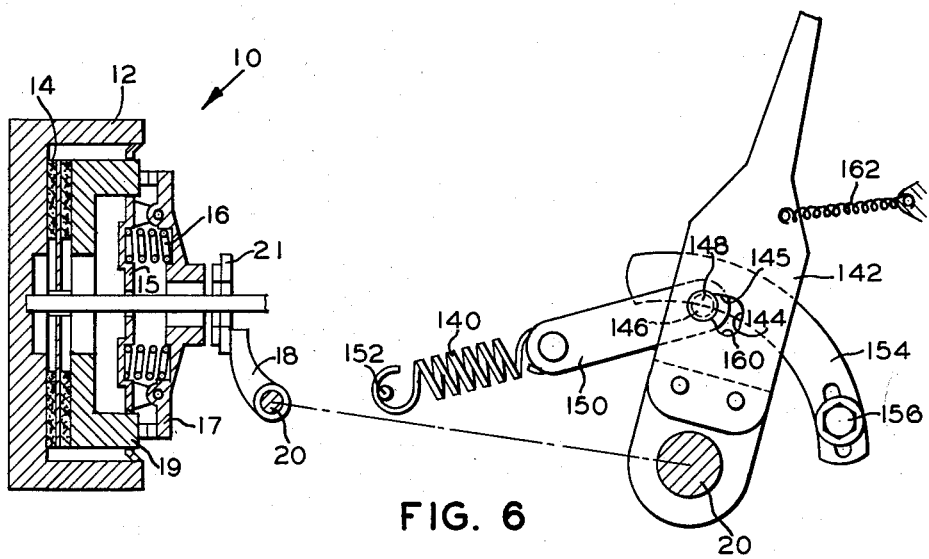
FIG. 6 is an elevation view of a modified form of the present invention adapted to be part of a hand lever.
Figure 8:
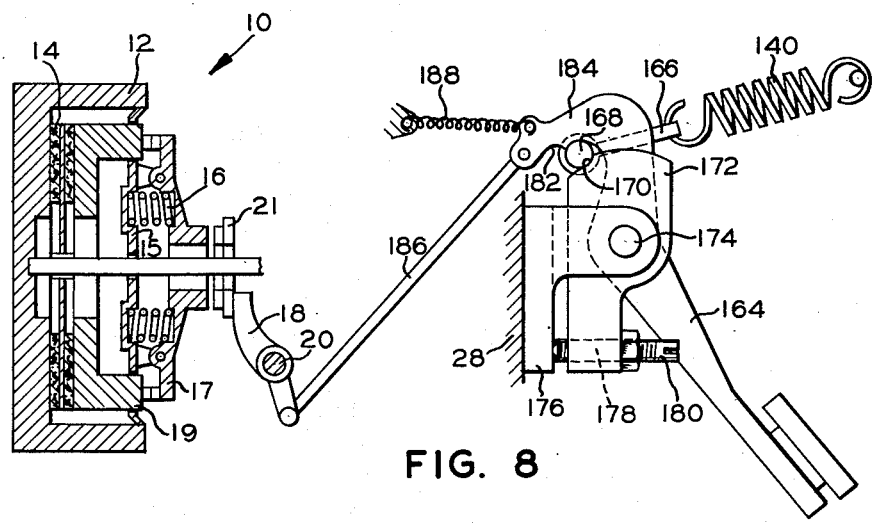
FIG. 8 is an elevation view of another modification of the present invention adapted to be part of a foot pedal lever.

Referring now to the drawings, typical clutch installations are illustrated in FIGS. 1, 3, 6 and 8 where an assist device can be advantageously employed. FIGS. 1, 6 and 8 diagrammatically show a friction clutch 10 of the type generally comprising a drive member 12 and a driven member 14 which is spring loaded, as at 16, into engagement with the drive member 12 and suitably disposed to transmit the torque developed by a vehicle engine to a transmission. The engaging springs 16 react against the cover 15 to urge the levers 17 and in turn the pressure plate 19, which plate presses the driven member 14 into engagement with the drive member 12. The driven member 14 is disengaged from the drive member 12 against the loading force of the engaging springs 16 by counterclockwise rotation of a clutch fork 18 which forces the throw-out bearing 21 to depress levers 17 against spring 16. The clutch fork 18 is keyed or otherwise fastened to a clutch shaft 20 which is journalled for rotation in a clutch housing (not shown).

Figure 2:
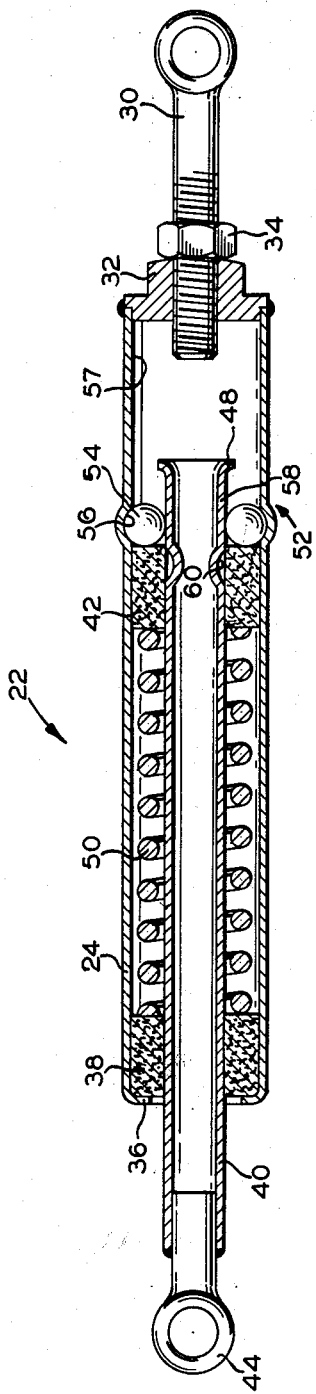
FIG. 2 is a longitudinal sectional view of an assist device embodying the present invention in a self-contained unit which is adapted to impart a thrust force in only one axial direction.

Referring now to FIGS. 1 and 2, a self-contained assist device, indicated generally by the reference number 22, comprises a cylindrical casing 24 which functions as a reaction means and is adapted to be pivotally connected, as at 26, to a stationary support 28. The pivotal connection 26 comprises an eye member 30 which has an elongated shank threadedly received in a cap 32. The cap 32 is suitably secured to one end of the cylindrical casing 24 as by welding. A lock nut 34 mounted on the eye member, locks the eye member 30 in an adjusted position relative to casing 24. The other end of the casing 24 is provided with a radially inwardly extending flange portion 36 which serves as an abutment for a bushing 38.

Operating means in the form of an actuating rod 40 is journalled within the casing 24, for axial movement relative thereto, by the bushing 38 and a second bushing 42 disposed further within casing 24. The end of rod 40 extending from the casing 24 is provided with an eye 44 for pivotal attachment to the lower end of a lever 46 which is adapted to rotate the clutch shaft 20. The other end of rod 40, within the casing 24, is provided with a radially outwardly extending flange 48 which serves as a stop to limit travel of the rod 40 relative to the casing 24 is an outward direction. A compression spring 50 surrounds the rod 40 and is positioned between the bushing 38 and the bushing 42 in a preloaded condition for urging the bushings in opposite axial direction. The bushing 38 is held against outward axial movement by the flange 36 of the casing 24 and the bushing 42 is normally held against inward axial movement relative to the casing 24 by selective coupling means 52.

The coupling means 52 comprises a plurality of cammable means preferably in the form of balls 54 which are normally received in a radially outwardly projecting annular groove or engaging means 56 provided in the casing 24. The balls 54 are urged into the groove 56 and normally held therein by the cylindrical surface 58 of the actuating rod 40. When the balls 54 are positioned in the groove 56, they cannot move relative to the casing 24 and thereby fixedly position the bushing 42 which abuts the balls 54. The fixedly positioned bushing 42 in turn maintains the spring 50 in a preloaded condition. The spring 50 is not at this time operatively connected to the rod 40.

The actuating rod 40 is provided with a radially inwardly extending annular groove or engaging means 60 which is normally axially displaced relative to the annular groove 56 of the casing 24. To operatively connect the compression spring 50 to the actuating rod 40, the actuating rod is moved axially inwardly (to the right as seen in FIG. 2) relative to the casing 24 until the groove 60 in rod 40 is aligned with the balls 54. The balls 54 are then cammed by the groove 56 in the casing 24 into engagement with the groove 60 of the actuating rod 40. The preloaded spring 50, which abuttingly engages bushing 42 which in turn engages balls 54 now positioned in grooves 60 in rod 40 and held therein by casing 24, urges inward axial movement of the rod 40 relative to the casing 24.

To fully set forth the advantages of the assist device 22 it is desirable to explain its operation from a clutch engaged position to a clutch disengaged position. Referring now to FIG. 1, a vehicle operator depresses a foot pedal 62 which rotates lever 64, pivotally mounted intermediate its ends on the stationary support 28, in a counterclockwise direction. A connection rod 66 is pivotally attached to the medial portion of the clutch operating arm 46 and the lower portion of lever 64. The counterclockwise movement of level 64 which moves the connecting rod 66, induces a simultaneous counterclockwise movement of clutch operating arm 46. Movement of the arm 46 causes the actuating rod 40, which is pivotally attached to the lower end thereof, to be moved axially inwardly relatively to the stationary casing 24. As soon as the annular grooves 60 and 56 are in alignment the balls 54 will be cammed into engagement with the groove 60 by the reaction between the balls 54 and the groove 56 and inner cylindrical wall 57 of the casing 24, thereby permitting the spring 50 to exert an axial thrust force against the rod 40 urging it axially inwardly relative to the stationary casing 24. This axial movement decreases the overall length of the device 22 which urges the arm 46 counterclockwise and aids the operator in moving the lever 64 to disengage the clutch. It is seen, then, that the spring 50 acts in opposition to the clutch engaging springs 16 and aids the operator to overcome the latter.

To re-engage the clutch the operator release the pedal 62, whereupon the engaging springs 16 of the clutch will rotate the arm 46 in a clockwise direction moving the actuating rod 40 in an axially outward direction relative to the casing 24. At the point where the grooves 56 and 60 are aligned the coupling balls 54 will be cammed into the grooves 56 by the reaction between the balls 54 and the grooves 60 and the cylindrical surface 58 of the rod 40, thereby fixedly positioning the spring 50 to the stationary casing 24. The spring 50 is then completely "locked-out" of the system. A tension type pedal return spring 68 is provided to return the pedal 62 to its original position wherein it will not cause any excessive wear of the clutch parts.

The construction of this assist device 22 is extremely simple. The changeover from "lock-out" to assist action is accomplished smoothly and upon extremely short relative movement between the rod 40 and the casing 24. This travel may be fixed as desired by adjusting eye 30 to vary the offset between the grooves 56 and 60. As is well known in the art, when a spring loaded clutch approaches the disengaged position, there is a "build-up" in the clutch springs 16 which requires more effort to overcome than when disengagement was commenced. The adjusting means permits the effort of the assist device 22 to be brought into the system where it parallels the "build-up" of the clutch springs' resistance thereby lowering the manual effort required of an operator. Since the device merely assists, there is no loss of lever "feel."

Figure 3:
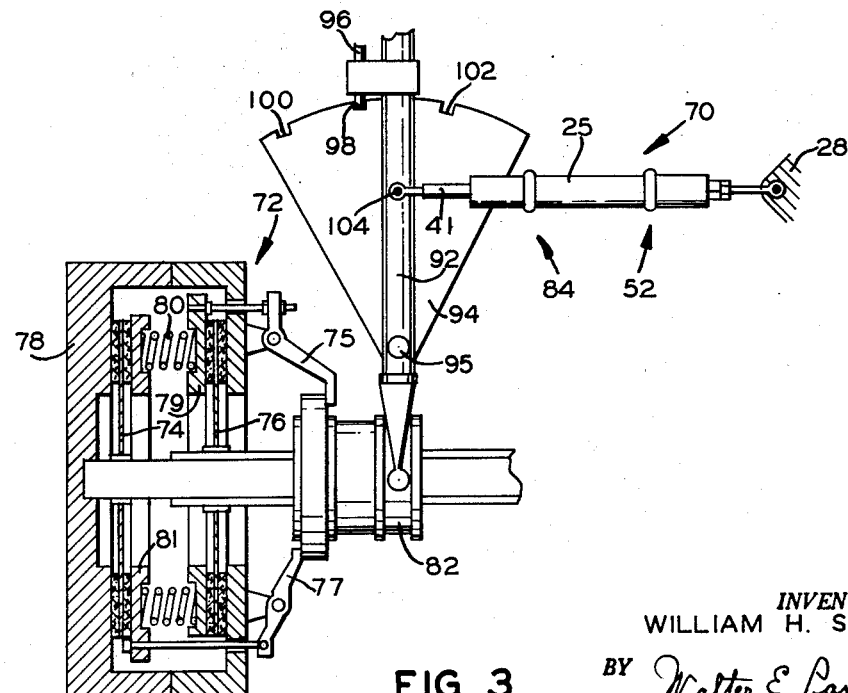
FIG. 3 is a diagrammatic elevation view of a dual clutch installation embodying the assist device shown in FIG. 4.
Figure 4:
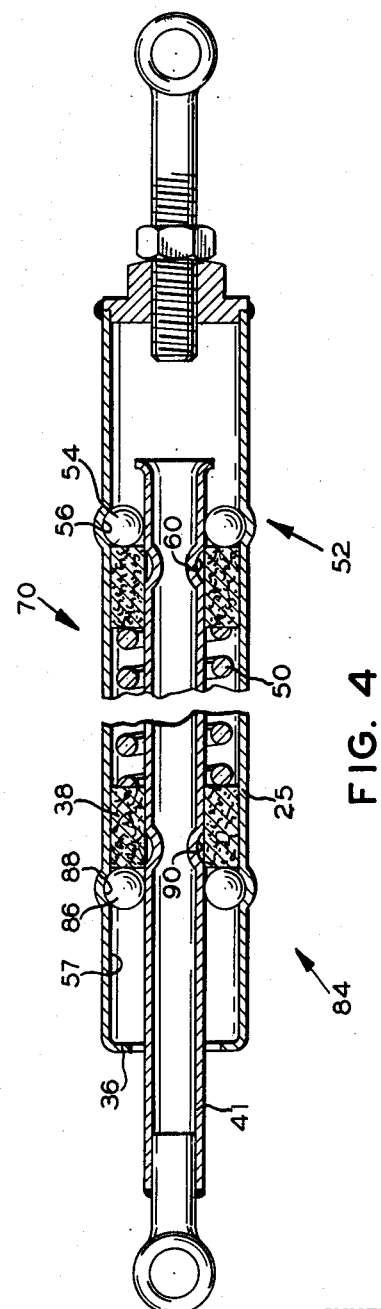
FIG. 4 is a view similar to FIG. 2 but of a device adapted to impart a thrust force in both axial directions.

Referring now to FIGS. 3 and 4, the assist device 70 disclosed therein is primarily designed for use with a double clutch structure 72 wherein a pair of driven members 74 and 76 are normally biased into engagement with a drive member 78. The driven members are normally positioned in a back-to-back relationship for utilization of common biasing means 80. With this type of clutch structure the assist device 70 is required to assist moving a throw-out collar 82 in either axial direction so as to disengage either driven member 74 or 76 from the drive member 78 against the biasing effort of the engaging springs 80. The assist device 70, therefore, is provided with a second set of coupling means 84 in addition to the coupling means 52. The coupling means 84 is located inwardly of the flange end 36 of the casing 25 so that the compression spring 50 can react by expanding in either axial direction.

More specifically, the coupling means 84 comprises a set of balls 86 which are shown received in a radially outwardly extending annular groove 88 provided in the casing 24 with the balls 54 of the coupling means 52 engaged in the groove 56 in the casing 24. A rod 41 is provided with a radially inwardly extending annular groove 90 which is normally axially displaced relative to the groove 88 in the same manner that the grooves 56 and 60 are axially displaced.

To operatively connect the compression spring 50 to the actuating rod 41 so that the rod 41 is urged axially outwardly (to the left as seen in FIG. 4) the rod 41 is moved outwardly relative to the casing 25 until the groove 90 therein is aligned with the balls 86. The balls 86 are then free to move from engagement with the groove 88 in the casing 25 into engagement with the groove 90 of the actuating rod 41. The preloaded spring 50, which abuttingly engages bushing 38 which in turn engages balls 86 now positioned in grooves 90 in rod 41, urges outward axial movement of the rod 41 relative to the casing 25.

Referring now to FIG. 3, the driven members 74 and 76 are arranged to be released, against the action of the engaging springs 80 as previously explained, by axial movement of the throw-out collar 82. The collar 82 is adapted to be shifted longitudinally by a hand lever 92 pivotally mounted on a sector 94 by a pin 95. The sector 94 is provided with notches 98, 100 and 102 into which a pin 96, carried by the lever 92, may be locked for positioning the lever 92 in any one of three positions.

To disengage the driven member 76 a vehicle operator moves the hand lever 92 forward (to the left as viewed in FIG. 3) so that the pin 96 engages the notch 100. Since the actuating rod 41 of the assist device 70 is pivotally connected, as at 104, to the hand lever 92 it is moved axially outwardly relative to the stationary casing 25. As soon as the annular grooves 88 and 90 are in alignment the balls 86 will be cammed into engagement with the groove 90 by the reaction between the balls 86 and the groove 88, thereby permitting the spring 50 to exert an axial thrust force against the rod 41 urging it axially outward relative to the casing 25. Since the rod 41 is operatively connected to the lever 92 it is seen, then, that the spring 50 also urges rotation of the lever 92 and aids the operator to overcome the clutch engaging springs 80. When the lever 92 is returned to its central position the spring 50 is completely "locked-out" of the system as shown in FIG. 4.

The assist device 70 will also aid the vehicle operator in moving the lever 92 rearwardly (to the right as viewed in FIG. 3) to disengage the driven member 74 in a similar manner.

The assist device 106 shown in FIG. 5 is modified so as to be an integral part of a conventionally operated hydraulic slave cylinder. The slave cylinder comprises an elongated tubular piston casing 108 having one of its ends (the right end as viewed in the drawing) provided with a cap 110 for threadedly receiving an eye 112 which is pivotally attached to a stationary support, not shown. The left end of the casing 108 is provided with a radially inwardly extending flange portion 114 which serves as an abutment for a bushing 116.

A piston rod 118 is journalled for axial movement relative to the casing 108, in the bushing 116 and a bushing 120 contained further therein. Resilient means 122 is operatively disposed within the casing 108 between the cap 110 and the bushing 120 for urging the bushing 120 axially to the left. Coupling means 124 are provided for normally fixedly positioning the resilient means 122 to the casing 108 in a preloaded state. The coupling means 124 comprise a plurality of balls 126 which are normally engaged in a groove 128 provided in the casing 108. The piston rod 118 is provided with an annular groove 130 which is normally axially offset relative to the groove 128 and a conventional piston 132 which is located intermediate the coupling member 124 and the bushing 116. A hydraulic inlet port 134 is positioned behind the piston 132 for supplying hydraulic fluid to the piston. The left end of the casing 108 is sealed against contamination by a suitable cap 136. It is seen then, that when hydraulic fluid is admitted to the chamber 138 in the casing 108, the piston 132 will move the rod 118 to the left relative to the stationary casing 108 whereupon the annular groove 130 will become aligned with the groove 128. In moving past this position the balls 126 will be cammed into the groove 130 thereby operatively connecting the compression spring 122 to the piston rod 118. The spring 122 now exerts a thrust force to the rod 118 in addition to the force thereon induced by the action of the hydraulic fluid on the piston 132.

This assist device 106 as shown in FIG. 5 is of the expansion type, rather than the contraction type as shown in FIG. 2, however, by arranging the groove means and spring means in various manners, any of the devices shown can be adapted to operate in expansion or contraction.

FIG. 6 shows a modified form of the invention wherein a tension spring 140 may be operatively connected directly to a clutch arm 142, which is in the form of a hand-operated lever. The hand-operated lever 142 is provided with an "L-shaped" aperture 144 for receiving a cylindrical cam follower 146 having an enlarged head portion 148 thereon. The cam follower 146 is secured, as by a link 150, to one end of the tension spring 140. The other end of the tension spring is suitably secured to the clutch housing (not shown), as by a pin 152, which serves as a stationary support.

Figure 7:
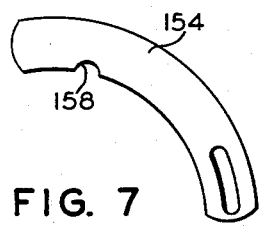
FIG. 7 is a detail of one of the elements shown in FIG. 6 to more clearly illustrate the detent therein.

An arcuate member 154 is located in a spaced relationship relative to the hand lever 142 and is adjustably mounted on the clutch housing (not shown) by means of a cap screw 156 and serves as a stationary support. The arcuate member 154 is provided with a detent 158 (shown more clearly in FIG. 7) which is operatively disposed relative to the circumferentially extending leg 145 of the "L-shaped" aperture 144 for cooperation therewith to hold the tension spring 140 in an inoperative preloaded position.

To operatively connect the tension spring 140 to the hand operated lever 142, to assist in rotating the clutch shaft 20 in a counterclockwise direction to disengage the clutch, the vehicle operator will move the hand lever 142 in a counterclockwise direction. During the first increments of movement of the hand lever 142, it will move relative to the cam follower 146 until the cam follower coincides with the radially extending leg 160 of the "L-shaped" aperture 144. At this point the cam follower 146 will be cammed into the radially extending leg 160 of the aperture 144 and the tension spring 140 will then exert a force directly on the lever 142 tending to rotate the same in a counterclockwise direction in addition to the operator's manual effort to rotate the lever.

To re-engage the clutch the operator will release the hand lever 142 and the engaging springs 16 of the clutch 10 will rotate the clutch shaft 20 in a clockwise direction in opposition to the tension force of the spring 140. At the point where the radially extending leg 160 of the aperture 144 coincides with the detent 158 in the stationary member 154 it is seen that the reaction between the cam follower 146 and the circumferentially extending leg 145 will cam the follower 146 into the detent 158 thereby locking the tension spring 140 to the stationary member 154 and rendering it inoperative relative to the hand lever 142 since the reaction is maintained within the stationary members 154 and 152 which members are both carried by the vehicle frame (not shown). A return spring 162 is provided between the clutch housing and the hand lever 142 in such a position so as to completely return the hand lever 142 to its clutch engaged position so that there is no excessive wear of the clutch parts.

In the modified form of the invention shown in FIG. 8 the tension spring 140 is shown connected to a foot operated pedal lever 164 instead of a hand lever. More specifically, the tension spring 140 is suitably connected to a cam follower 168 by a link 166. When the clutch is in its engaged position, the follower 168 is received in a detent 170 provided in a positionable stationary member 172. The stationary member 172 is pivotally mounted at 174 on an intermediate member 176 which is suitably secured to the fixed support 28. The stationary member 172 is further provided with an aperture 178 for threadedly receiving a screw 180. The screw 180 bears against the member 176 and by adjusting this screw 180 the relative positions of the detent 170 and a detent 182 provided in the pedal 164 can be changed to vary the change-over of the cam follower 168 from "lock-out" to assist action.

This detent 182, in the pedal 164, is located in spaced relationship relative to the detent 170 of the member 172 so that upon pivotal movement of the pedal 164 in a clockwise direction the cam follower 168 will be cammed into a detent 182 in the upper arm 184 of the pedal 164. The tension spring 140 now will exert a force upon the pedal 164 which is connected by a link 186 to the lever arm 46 of the clutch 10 and acts in opposition to the internal clutch engaging springs 16.

When the clutch is to be re-engaged the operator releases the foot pedal 164 and the internal clutch engaging springs 16 will rotate the pedal 164 by means of the linkage 186 therebetween in a counterclockwise direction and the follower 168 will be cammed into the detent 170 of the stationary member 172 thereby rendering the tension spring 140 inoperative to act upon the pedal 164 since the reaction of the spring is entirely contained by the member 172 and a pin, both being stationarily mounted on a vehicle frame (not shown). The clutch pedal 164 is provided with the usual return spring 188 so as to return the pedal to a completely inoperative position upon release thereof.

Referring now to FIGS. 1 and 9, the assist device 22 is provided with means for eliminating the conventional clutch return spring 68. More specifically, an actuating rod 43 is provided with an internal abutment means 190 for abuttingly engaging one end of a compression spring 192. The other end of the compression spring 192 bears against a pin 194 which is movably positioned in an elongated slot 196 in the actuating rod 40. The pin 194 is abuttingly mounted in a counterbore 198 provided in the bushing 42 and adapted for movement therewith.

The spring 192 exerts an axial outward thrust force on the rod 43 when the balls 54 are engaged in the groove 56 of the casing 24, elongating the device 22, which elongation urges rotation of the arm 46 in a clockwise direction. This clockwise movement of the arm 46 causes the link 66 to hold the clutch pedal 62 in its fully released position wherein it will not cause any wear of the clutch parts. The compression spring 192 is "locked-out" of the system in the same manner as the assist spring 50 when the spring 50 becomes operative, since the bushing 42 is locked to the rod 40 thereby preloading the spring 192 between the abutment 190 and the pin 198, and does not subtract from the force of the spring 50 during its assist cycle.

From the foregoing, it is apparent that assist devices for an operating lever have been described, which are inoperative in one lever position yet are operative to assist movement of the lever to another position; that may be disposed in a self-contained unit; that will facilitate the disengagement of a clutch while not interfering with the engagement thereof; and that while assisting will not build up excessive urging forces.

It will be obvious that various changes in the details, which have been herein described and illustrated in order to explain the nature of this invention, may be made by those skilled in the art within the principles and scope of the invention as expressed in the appended claims.

What is claimed is:

1. In an assist device a reaction means, means movable to a plurality of positions relative to said reaction means, spring means connected to said reaction means, and means locking said spring means in a preloaded condition to said reaction means in one of said positions, said locking means releasing an operative portion of said spring means from said reaction means and locking said operative portion to said movable means in another of said positions whereby said spring means urges relative movement between the reaction means and the movable means.

2. In a normally engaged spring loaded clutch, manually operable means connected to said spring loaded clutch and being operative to effect disengagement thereof against the bias of the clutch springs, and an assist means operatively connected to said manually operable disengaging means and including resilient means held in a preloaded position disconnected from said manually operable disengaging means when said clutch is engaged, said preloaded resilient means being operatively connected to said manually operable means upon a predetermined movement of said manually operable means to assist said manually operable means in effecting disengagement of said clutch.

3. In a spring biased clutch, manually operable means connected to said spring biased clutch and being operative to operate said clutch in opposition to the spring bias, and assist means operatively connected to said manually operable means, said assist means including resilient means disconnected from said manually operable means and held in a preloaded condition when said clutch is in one position, and said preloaded resilient means being connected to said manually operable means upon a predetermined movement thereof to aid said manually operable means to overcome the spring bias of the clutch.

4. An assist device adapted to impart an urging force to an element comprising in combination, a first member, a second member movable relative to said first member and adapted to be operatively connected to the element, resilient means adapted to be connected to said first and second members, said first and second members having engaging means thereon, and coupling means adapted to be positioned by said engaging means of said first member to maintain said resilient means in a preloaded condition, said coupling means further being adapted to be cammed out of engagement with said first member and into engagement with said engaging means of said second member upon relative movement between said members to couple said resilient means to said second member whereby said resilient means urges continued relative movement between said members.

5. An assist device adapted to impart an urging force to an element comprising in combination, a resilient means having a first end and a second end, a first member adapted to be continuously operatively connected to the first end of said resilient means and selectively connected to the second end of said resilient means, a second member movable relative to said first member and operatively connected to the element, said second member being adapted to be selectively connected to the second end of said resilient means, and coupling means normally selectively connecting the second end of the resilient means to said first member thereby preloading said resilient means and selectively connecting the second end of the resilient means to said second member upon a predetermined relative movement between said members whereby said resilient means by reacting between said members urges continued relative movement.

6. An assist device adapted to impart an urging force to an element comprising in combination, a first relatively stationary member, a resilient means having a relatively stationary end and a movable end, a second member movable relative to said first member and operatively connected to said element, said first and second members having engaging means thereon and coupling means being adapted to engage the movable end of said resilient means to the engaging means of said first member to preload said resilient means, said coupling means further being adapted to disengage the movable end of said resilient means from said first member and engage the same to the engaging means of said second member upon relative movement between said members whereby said resilient means urges continued relative movement between said members.

7. An assist device adapted to impart an urging force to an element comprising in combination, a first relatively stationary member, a resilient means having a relatively stationary end and a movable end, a second member pivotally mounted relative to said first member and operatively connected to said element, said first and second members having engaging means thereon, and coupling means being adapted to engage the movable end of said resilient means to the engaging means of said first member thereby preloading said resilient means, said coupling means further being adapted to disengage the movable end of said resilient means from said first member and engage the same to the engaging means of said second member upon relative movement between said members whereby said resilient means urges continued relative movement between said members.

8. An assist device adapted to impart an urging force to an element comprising a first tubular member, a second member telescopically disposed relative to said first member, each member having at least one annular groove therein in a normally axial spaced relationship, adjustable means associated with one of said members to position the annular grooves relative to each other, resilient means for urging said members in opposite axial directions, and coupling means operatively associated with said resilient means and adapted to alternately engage the annular grooves of said members, whereby when said members are in their normal axial spaced relationship said coupling means engages said resilient means in a preloaded condition to one of said members and upon a predetermined movement of said members relative to each other said coupling means connects the resilient means to the other said member thereby urging said members in opposite axial directions.

9. An assist device adapted to impart an urging force to an element comprising, a first tubular member, a second member telescopically disposed relative to said first member, each member having a first and a second axially displaced annular groove therein, said first grooves in said members being normally in an axial spaced relationship and adapted for cooperation with each other and said second grooves in said members being normally in an axial spaced relationship and adapted for cooperation with each other, resilient means for urging said members in opposite axial directions, and first and second coupling means operatively associated with said resilient means and adapted to alternately engage the first second annular grooves, respectively, so that when said members are in their normal axially spaced relationship said first and second coupling means connects said resilient means in a preloaded condition to said first member, and upon a predetermined relative movement of said members in one axial direction, said first coupling means connects the resilient means to said second member and upon a predetermined relative movement in the other axial direction said second coupling means connects the resilient means to said second member, whereby said resilient means urges relative movement between said first and second members in both axial directions.

10. An assist device comprising in combination, a tubular casing having a rod telescopically received therein, a piston on said rod in sliding engagement with said cylinder defining a first and a second chamber, said casing and said rod each having an annular groove therein in axial spaced relationship, resilient means in said first chamber for urging said rod relative to said casing, and coupling means operatively associated with said resilient means and adapted to alternately engage the annular grooves of said casing and said rod, said coupling means being normally engaged in the annular groove of said casing, and means for introducing fluid into said first chamber to cause said rod to move relative to said casing, said coupling means engaging the annular groove of said rod for effecting coupling of said resilient means thereto upon said relative movement between said rod and said casing whereby said resilient means urges continued relative movement between said casing and said rod.

11. An assist device facilitating the pivotal movement of an operating lever carried by a shaft comprising, a lever having the intermediate portion thereof provided with an aperture, said aperture being L-shaped to define a pair of legs, one extending radially and one circumferentially relative to said shaft, a stationary member having a detent therein, said detent being in spaced relationship to the circumferentially extending leg of the L-shaped aperture, a cam follower positioned in the L-shaped aperture and adapted to normally be cammed into engagement with said detent by a surface defining said aperture, and resilient means connected in a preloaded condition to said cam follower when said cam follower is in engagement with said detent whereby upon a predetermined movement of said lever the cam follower is disengaged from said detent and engages the radially extending leg of the L-shaped aperture thereby operatively connecting the resilient means to the lever.

12. An assist device for facilitating rotational movement of a pivotally mounted pedal, comprising a pedal member having a detent means formed therein, an adjustably member stationary relative to said pedal member and also having a detent means formed therein, said detent means disposed in spaced relationship, a cam follower adapted to normally be cammed into engagement with the detent of the stationary member by said pedal member, resilient means connected in a preloaded condition to said cam follower when said follower is in engagement with said stationary member, said cam follower being cammed into the detent of said pedal member upon a predetermined movement of said pedal member thereby connecting said resilient means to said pedal member so that said resilient means is operative to urge continued movement of said pedal member.

13. An assist device adapted to impart urging forces to an element in opposite directions comprising in combination, a movable member operatively connected to the element, a first and a second resilient means adapted to urge said member in opposite directions, and means operatively associated with said movable member for alternatively operatively connected one of said resilient means to said movable member and preloading the other said resilient means upon predetermined movement of said movable member whereby said member is biased only by said resilient means operatively connected thereto.

14. In an assist device, a reaction means, means movable to a plurality of positions relative to said reaction means, a first spring means connected to said reaction means, a second spring means connected to said movable means, and locking means in one of said positions locking said first spring means in a preloaded condition to said reaction means and said second spring means in a reactive condition between said movable means and reaction means, said locking means releasing said first spring means from said reaction means and locking it to said movable means and locking said second spring means in a preloaded condition to said movable member in another of said positions, whereby said spring means alternatively urge said reaction means and said movable means relative to each other.

15. An assist device adapted to impart urging forces to an element in opposite directions comprising, a pair of tubular members in slidable telescopic relation, each member having an annular groove therein in normally axial spaced relationship, a first resilient means for urging said members in opposite axial directions, a second resilient means for urging said members in opposite directions oppositely with respect to said first resilient means, and locking means operatively associated with both said resilient means and adapted to alternatively engage the annular grooves of said members so that when said members are in their normal axial relationship said locking means holds said first resilient means in a preloaded condition to one of said members and connects said second resilient means to both said members urging them oppositely, and upon a predetermined relative movement of said members opposite to the movement urged by said second resilient means said locking means connects said second resilient means in a preloaded condition to said other member and said first resilient means to both said members whereby said first resilient means urges continuation of the predetermined movement.

16. An assist device adapted to impart urging forces to an element in opposite directions comprising, a first tubular member, a second tubular member telescopically disposed with respect to said first tubular member, each member having an annular groove therein positioned in normally displaced relationship, a first resilient means disposed in said first tubular member for urging said members in opposite axial directions with respect to their normal positions, a second resilient means disposed in said second tubular member for urging said members to return to their normal positions, and locking means operatively associated with both said resilient means and adapted to alternately engage the annular grooves of said members so that when said members are in their normal axial relationship said locking means locks said first resilient means in a preloaded condition to said first member and connects said second resilient means to both said members for urging them oppositely to their normal position, and upon a predetermined relative movement of said members opposite to the direction urged by said second resilient means, said locking means locks said second resilient means in a preloaded condition to said second member and said first resilient means to both said members whereby said first resilient means urges continuation of the predetermined movement.

17. A device adapted to impart an urging force to an element comprising in combination a first member, a second member movable relative to said first member and adapted to be operatively connected to the element, resilient means for biasing said second member relative to said first member, and means including said members and a connecting means for normally retaining said resilient means in a preloaded condition with the biasing force thereof inoperative to bias said members relative to each other, said connecting means operatively connecting the biasing force of said resilient means to both said members upon movement of said second member relative to said first member, whereby said resilient means urges continued movement of said second member relative to said first member.

18. An assist device adapted to impart an urging force to an element comprising in combination, a first member, a second member movable relative to said first member and adapted to be operatively connected to the element, said first and second members each having engaging means thereon, resilient means adapted to be operatively connected to the engaging means of said members, and coupling means adapted to be engaged by said engaging means of one of said members to maintain said resilient means in a preloaded condition, said coupling means further being adapted to be cammed out of engagement with the engaging means of said one member and into engagement with the engaging means of said other member upon relative movement between said members to couple said resilient means to said other member, whereby said resilient means urges continued relative movement between said members.

19. An assist device adapted to impart an urging force to an element comprising a first tubular member, a second member telescopically disposed relative to said first member, each member having at least one engaging means therein in normally axially spaced relationship, resilient means for urging said members in opposite axial directions, said resilient means having a first and a second end with the first end constantly operatively connected to one of said members and the second end adapted to be alternately operatively connected to said members, and coupling means operatively associated with the second end of said resilient means and adapted to alternately engage the engaging means of said members, whereby when said members are in their normal axially spaced relationship said coupling means engages the engaging means on said one member thereby operatively connecting the second end of said resilient means to said one member thereby preloading said resilient means with the biasing force thereof entirely contained by said one member and upon a predetermined movement of said members relative to each other said coupling means connects the second end of said resilient means to the other said member whereby said resilient means urges continued relative movement of said members.

References Cited by the Examiner

UNITED STATES PATENTS

| 762,838 | 6/04 | Norton | 51—95 |
| 2,006,913 | 7/35 | Conley | 192—99 X |
| 2,110,265 | 3/38 | Gillett | 192—99 |
| 2,239,568 | 4/41 | Newton | 192—105 |
| 2,556,054 | 6/51 | Allan et al. | 74—2 X |
| 2,580,596 | 1/52 | Richardson | 74—2 |
| 2,698,541 | 1/55 | Fox | 74—2 |

DAVID J. WILLIAMOWSKY, *Primary Examiner.*

THOMAS J. HICKEY, ROBERT C. RIORDON
*Examiners.*